United States Patent [19]

Fritsche et al.

[11] Patent Number: 5,707,436
[45] Date of Patent: *Jan. 13, 1998

[54] PROCESS FOR THE PRODUCTION OF PURPLE PIGMENTS

[75] Inventors: Klaus-Dieter Fritsche, Colditz; Bernd Dorbath, Alzenau; Norbert Giesecke, Bruchköbel; Kerstin Ruhnau, Colditz, all of Germany

[73] Assignee: Cerdec Aktiengesellschaft Keramische Farben, Frankfurt, Germany

[*] Notice: The term of this patent shall not extend beyond the expiration date of Pat. No. 5,589,273.

[21] Appl. No.: 412,972

[22] Filed: Mar. 29, 1995

[30] Foreign Application Priority Data

Mar. 30, 1994 [DE] Germany .................. 44 11 104.5

[51] Int. Cl.⁶ ........................................ C09C 1/62
[52] U.S. Cl. .................. 106/403; 106/439; 106/440; 106/441; 106/480; 106/489; 106/312; 106/313; 501/19; 501/32; 428/404; 428/432; 428/433; 428/434; 428/472
[58] Field of Search ............... 501/19, 32; 106/403, 106/439, 440, 441, 489, 480, 313, 312; 428/404, 432, 433, 434, 472

[56] References Cited

U.S. PATENT DOCUMENTS

| | | | |
|---|---|---|---|
| 4,698,324 | 10/1987 | Haruta et al. | 502/243 |
| 4,839,327 | 6/1989 | Haruta et al. | 502/243 |
| 5,252,522 | 10/1993 | Dorbath et al. | 106/403 |
| 5,589,273 | 12/1996 | Dorbath et al. | 427/217 |

FOREIGN PATENT DOCUMENTS

| | | |
|---|---|---|
| 0 307 771 | 3/1989 | European Pat. Off. . |
| 0 501 139 | 9/1992 | European Pat. Off. . |
| 32 29 837.4 | 4/1987 | Germany . |
| 41 06 520 A1 | 9/1992 | Germany . |
| 1 436 060 | 5/1976 | United Kingdom . |

OTHER PUBLICATIONS

Derwent Abstract AN 89–087188 of DE 3731174 and EP 307771, Aug. 1991.

Toshiba KK, Database WP1, Week 9106, Derwent Publications Ltd. London GB AN 91–041113 JP–A–02 308 866 21 Dec. 1990.

Nanao et al., Chemical Abstracts, vol. 109 No. 26 26 Dec. 1988 Columbus, Ohio Abstract No. 232852b JP–A–63 197 638.

Agency of Ind. Sci & Technology, Database WSP1 Section CH Week 9421 Derwent Publ. Ltd. GB Class J04 AN94–061881 JP–A–06 016422 25 Jan. 1994.

*Primary Examiner*—Mark L. Bell
*Assistant Examiner*—Scott L. Hertzog
*Attorney, Agent, or Firm*—Wenderoth, Lind & Ponack

[57] ABSTRACT

Prior art production of purple pigments based on colloidal gold on stovable/sinterable/fireable support material involves the reduction of a gold compound in the presence of a chemical reducing agent.

Purple pigments may be produced more simply according to the invention by intimately mixing and/or grinding the support material and the gold compound in dry form or by bringing an aqueous solution or suspension of a gold compound and a support material into contact and then thermally treating the mixture at a temperature above the decomposition temperature of the gold compound and below the sintering temperature of the support material, wherein the gold compound is converted into colloidal gold.

10 Claims, No Drawings

PROCESS FOR THE PRODUCTION OF PURPLE PIGMENTS

SPECIFICATION

This invention relates to a process for the production of purple pigments based on stovable (fireable, sinterable) support materials, in particular glass fluxes, coated with colloidal gold.

Purple pigments based on ceramic materials and colloidal gold may be obtained in various ways and have long been used for producing ceramic decoration and for pigmenting plastics, lacquers, cosmetic products and decorative paints.

Until recently, the production of purple pigments comprised several processing stages: (a) precipitation of Cassius gold purple in gel form from aqueous gold salt solutions using reducing agents, customarily tin(II) salts, (b) mixing the moist gold purple with finely ground glass, (c) presintering the mixture at 600° to 800° C., wherein the gold particles are at least partially enclosed in glass and (d) finely grinding the sintered material. DE 41 06 520 (U.S. Pat. No. 5,252,522) teaches a simplified process for the production of such gold pigments: in this process, a glass frit with an average particle diameter in the range from 0.5 to 50 µm is coated with colloidal gold and optionally hue-modifying metals, by adding to an aqueous suspension containing the glass frit and water-soluble salts of the metals a reducing agent which deposits the metals in colloidal form onto the surface of the glass frit; after separation of the aqueous phase, the pigment is dried in a customary manner.

DE-PS 32 29 837 teaches a process for the production of cherry red pigments, wherein lamellar particles coated with metal oxides are coated in the presence of organic solvents with gold resinates dissolved therein and are then baked at 300° to 900° C., preferably at 500° to 600° C. This document does not teach the use of gold compounds other than organic gold resinates nor the use of water instead of organic solvents.

The object of the present invention is to provide a process which may be performed more simply than prior art processes. It particular it should be possible to dispense with the use of organic solvents and organic or inorganic reducing agents.

A process has been discovered for the production of purple pigments based on stovable support materials from the range of glass fluxes or other oxide or silicate materials or mixtures thereof coated with colloidal gold, comprising bringing a finely powdered support material into intimate contact with one or more gold compounds, wherein the weight ratio of support material to gold in the gold compounds is between 10:1 and 2,000:1, which process is characterised in that the support material and the gold compound(s) are intimately mixed and/or ground in dry form or the support material is brought into contact with an aqueous solution or suspension of the gold compound(s) in the absence of a reducing agent and the resultant mixture is thermally treated at a temperature above the decomposition temperature of the gold compound(s) and below the sintering temperature of the support material until the gold compound(s) are converted into colloidal gold.

Additional disclosure is provided relating to preferred embodiments of the process according to the invention.

It is surprisingly possible directly to produce a stable purple pigment by thermal treatment of a decomposable gold compound in the presence of a sufficient quantity of a support material, without it previously being necessary to produce colloidal gold in the aqueous phase by reduction of a gold compound using an organic or inorganic reducing agent.

Preferred stovable support materials which are to be coated are glass fluxes, in particular glass frits. It is, however, also possible, instead of the glass fluxes, to use oxides as are used in glass production, in particular $SiO_2$, $Al_2O_3$, $TiO_2$, $ZrO_2$, $La_2O_3$ and $CeO_2$ and silicates, such as alkaline-earth metal silicates, zirconium silicate and aluminium silicate, alone or combined with each other or with glass frits. The oxides or silicates used are conveniently those which are sufficiently soluble in the glass flux during firing of the decoration. It is possible by combining the glass fluxes with specific oxides, such as titanium oxide and cerium dioxide, to shift the purple colour of the pigment towards blue. It is also possible to shift the purple colour towards blue by using cobalt oxide in conjunction with a glass flux or directly using a glass flux containing cobalt. Glass fluxes are taken to be combinations of materials which form a glass layer under the stoving conditions. Preferred glass fluxes are so-called glass frits, namely glasses which are chilled and ground after melting. As is known, glass frits are available in a very wide range of chemical compositions. Such glass frits also differ in terms of their physical properties, for example in their softening and melting behaviour and their coefficients of expansion $\alpha$. Glass frits which are transparent or opaque, colourless or coloured with colouring oxides may be used in the process according to the invention. Both frits containing lead and lead-free glass frits may be used.

When producing the purple pigment, the person skilled in the art will use a glass frit having physical properties which are optimally matched to those of the substrate to be decorated. Glass frits, as are used for the production of purple pigments for glass, generally begin to soften at between 450° and 600° C., whereas the softening point of glass frits for decorating ceramic materials and porcelain is preferably between 550° and 700° C. It has proved advantageous for the average particle diameter of the glass flux which is to be used to be between 0.5 and 50 µm, preferably between 1 and 20 µm and in particular between 1 and 10 µm.

Organic or inorganic gold compounds which may be used in the process according to the invention are those which are completely decomposed to colloidal gold during thermal treatment in the presence of the finely divided glass flux. The decomposition temperature of the gold compounds to be used is usually below 300° C., preferably between 150° and 250° C. The gold compounds to be used may be water-soluble or non water-soluble. Suitable gold compounds in the process according to the invention are in particular one or more compounds from the series lithium, sodium and potassium dicyanoaurate(I), gold cyanide, tetrahalogenoauric acid, in particular tetrachloroauric acid and hydrates thereof, gold(III) hydroxide, lithium, sodium and potassium disulphitoaurate(I), gold(III) sulphide, gold(I) thiolates and gold(I) ammine complexes. Readily commercially available inorganic gold compounds, such as tetrachloroauric acid and the tetrahydrate thereof, potassium dicyanoaurate, gold cyanide and gold sulphide are particularly preferably used. If desired, while being brought into contact with the finely powdered support material, water-soluble gold compounds may also be converted into non water-soluble compounds by adding a precipitating agent: for example tetrachloroauric acid may be converted into gold sulphide by adding ammonium sulphide and into gold hydroxide by adding sodium hydroxide solution and into a gold amine compound by adding ammonia.

An essential feature of the process is that the weight ratio of support material to gold in the form of the gold compounds present is within the claimed range; a weight ratio of support material to gold of between 20:1 and 200:1 is preferred.

According to a preferred embodiment of the invention, the glass flux and one or more decomposable gold compounds are intensively mixed when dry; alternatively or additionally, the raw materials may be ground together, preferably in a ball mill.

Instead of the very simple but effective dry grinding of the raw materials for the purple pigment, it is also possible to bring the gold compound(s) into contact with the glass flux in the form of an aqueous solution, for example by spraying the solution and homogeneously mixing; the quantity of solution is conveniently calculated that there is no necessity for a solid/liquid phase separation. If a non water-soluble gold compound prepared in the aqueous phase from a soluble gold compound is to be precipitated onto the support material, preferably a glass flux and in particular a glass frit, a precipitating agent is added to an aqueous suspension of the support material and a soluble gold compound, the suspension is subsequently filtered and, if necessary, washed.

The mixture containing support material and gold compound(s) produced by the raw materials being brought into contact when dry or by one of the above-stated wet processes is thermally treated, wherein, if present, water is first vaporised and the gold compound(s) are then decomposed into colloidal gold. Thermal treatment proceeds at a temperature below the sintering temperature of the support material, this being taken to be beginning of softening. In general, thermal treatment below 300° C. and in particular between 150° and 250° C. is sufficient. Duration of the treatment is generally between 10 minutes and approximately 6 hours.

The hue of the purple pigment may be modified by additionally bringing the support material into contact with an effective quantity of at least one compound of Ag, Cu, Co, Ni, Sn, Ru, Rh, Pd, Os, Ir, Pt in solid or aqueous form before, during or after it is brought into contact with at least one gold compound. The compounds acting to modify hue are then also deposited on the surface of the support material. Alternatively or additionally, the hue-modifying compounds may also be applied after thermal treatment onto the already formed purple pigment. Silver compounds, such as silver nitrate, silver carbonate, silver oxalate and silver tartrate, are particularly preferred for shifting the purple hue towards red. The quantity of metals used in the hue-modifying compounds is customarily between 1 and 100 wt. %, in particular between 5 and 50 wt. %, relative to the gold.

Neither reducing agents nor organic solvents are required to perform the process according to the invention. In the particularly preferred embodiment, production exclusively comprises an intensive mixing process and thermal treatment at a temperature below the sintering temperature of the support material, in general below 500° C. and particularly preferably below 300° C. Further grinding after thermal treatment is thus unnecessary.

The pigments or pigment intermediates obtainable using the process according to the invention sometimes do not yet have the final purple colour which is obtained after firing of the decoration. One advantage of the pigments according to the invention is that thermal treatment may proceed under moderate conditions and, if they are used as a pigment for ceramic purposes, the process may be ended without disadvantage at the pigment intermediate stage.

EXAMPLE 1

1 wt. % of gold, relative to the glass powder, as a 5 wt. % solution of tetrachloroauric acid in water is added to a finely ground, low-melting lead borosilicate (glass frit n° 10140 supplied by Cerdec AG) and mixed while moist. The subsequent thermal treatment of the mixture proceeds at 180° to 190° C. and gives rise to a light violet pigment.

After dry application of the pigment by simple powder application and after silk-screen application of a coloured paste containing a pigment and a silk-screen medium onto porcelain and also onto ceramic tiles and storing at 820° C. and alternatively at 870° C., a violet colour is produced which scarcely varies despite the differing stoving temperatures.

EXAMPLE 2

Tetrachloroauric acid is first added to an aqueous suspension of a finely ground, low-melting glass powder and dissolved; ammonium sulphide is then added in a quantity sufficient to ensure quantitative precipitation of the gold as gold sulphide. The suspension is filtered and washed; the solid is heated to 250° C., wherein it dries and the gold compound is simultaneously thermally decomposed—gold content, relative to glass powder, 1 wt. %. The resultant pigment stoves to a purple colour on porcelain and ceramic tiles.

EXAMPLE 3

Tetrachloroauric acid is added to an aqueous suspension of a finely ground glass frit (lead borosilicate) and dissolved—gold content 1 wt. %, relative to the glass frit, solids content of the suspension 65%. Concentrated ammonia solution—10 ml/g of gold—is added to the suspension, wherein a gold amine compound is precipitated onto the glass frit. The suspended solid is filtered out, washed and thermally treated at 250° C. A violet pigment is produced, which stoves to a purple colour on glass, porcelain and tiles.

EXAMPLE 4

In a similar manner to example 3, a lead-free, finely ground low-melting glass (grade 10150 supplied by Cerdec AG) is coated in an aqueous suspension with a gold amine compound using tetrachloroauric acid and ammonia. The aqueous suspension is adjusted to neutral with nitric acid; a freshly prepared suspension of silver oxalate is then mixed in—once filtered, washed and thermally treated at 250° C., the grey/violet pigment contains 1 wt. % of gold and 1 wt. % of silver. The resultant pigment stoves to crimson on glass, porcelain and tiles.

EXAMPLE 5

Silica (Aerosil®200 supplied by Degussa AG) and potassium dicyanoaurate are mixed together and homogenised in a ball mill—gold content 0.2 wt. % relative to silica. The mixture is thermally treated at 280° C., producing a purple pigment.

EXAMPLE 6

A lead-free glass frit, substantially containing $SiO_2$, $B_2O_3$, $Na_2O$ and 10 wt. % of $TiO_2$ is made into a paste with an aqueous solution containing $Na_3Au(SO_3)_2$ —0.1% Au, relative to the frit. The moist product mixture is dried and thermally treated at 275° C., wherein a purple pigment is obtained. When the pigment is fired on porcelain, a bluish purple decoration is obtained—the blue cast is attributed to the elevated $TiO_2$ content of the glass frit.

We claim:

1. A process for the production of a purple pigment based on a fireable support material selected from the group consisting of a glass flux, other oxide or silicate material and mixtures thereof coated with colloidal gold, comprising bringing a finely powdered support material into intimate contact with at least one gold compound, wherein the weight ratio of support materials to gold in the gold compounds is between 10:1 and 2000:1, characterized in that ($i_1$) the support material and the gold compound or compounds are intimately mixed and/or ground in dry form or ($i_2$) the support material is brought into contact with an aqueous solution or suspension of the gold compound or compounds in the absence of a reducing agent and without adding a precipitation agent for converting the water-soluble gold compound or compounds to water-insoluble compounds and (ii) the resultant mixture is thermally treated at a temperature above the decomposition temperature of the gold compound or compounds and below the sintering temperature of the support material until the gold compound or compounds are converted into colloidal gold.

2. A process according to claim 1 wherein a glass flux is used as the support material.

3. A process according to claim 2 wherein the glass flux is a glass frit having an average particle diameter in the range of from 0.5 μm to 50 μm.

4. A process according to claim 1, wherein at least one gold compound selected from the group consisting of Li, Na and K dicyanoaurate (I), gold cyanide, tetrahalogenoauric acid, Li, Na and K disulphitoaurate(I), gold sulphide, gold(I) thiolates, gold(I) amine complexes and gold oxide are used.

5. A process according to claim 4, wherein $HAuCl_4$ or a hydrate thereof is used.

6. A process according to claim 1, wherein the support material and the gold compound or compounds are brought into contact in a quantity such that the weight ratio of support material to gold is between 10:1 and 200:1.

7. A process according to claim 1, wherein the thermal treatment is performed in the range of between 150° C. and less than 300° C.

8. A process according to claim 1, wherein a water-soluble gold compound is dissolved in water the solution is brought into contact with the support material and the product, from which excess solution solution has been removed, is thermally treated.

9. A process according to claim 1, wherein, for the purpose of hue modification, the support material is additionally brought into contact with an effective quantity of at least one compound of Ag, Cu, Co, Ni, Sn, Ru, Rh, Pd, Os, Ir or Pt in solid or dissolved form before, during or after said support material is brought into contact with said at least one gold compound, before and/or after thermal treatment, whereby the compounds acting to modify hue are deposited on the surface of the support material.

10. A process according to claim 1 wherein a support material consisting of at least one glass frit and, optionally, up to 10 wt. % of hue-modifying oxides selected from the group consisting of $TiO_2$, $CeO_2$, $SnO_2$ and $SiO_2$, at least one solid gold compound and, optionally, an additional hue-modifying compound from the series of compounds of Ag, Cu, Co, Ni, Rh, Ru, Pd, Os, Ir and Pt, are ground together when dry and the mixture is thermally treated at a temperature in the range from 150° C. to a temperature below the softening point of the glass frit.

* * * * *